United States Patent
Karhumaki

[11] Patent Number: 6,126,218
[45] Date of Patent: Oct. 3, 2000

[54] ARRANGEMENT IN VEHICLE

[76] Inventor: Jorma Karhumaki, Partola-Keskus, FI-33950 Pirkkala, Finland

[21] Appl. No.: 09/277,408

[22] Filed: Mar. 26, 1999

[51] Int. Cl.[7] ....................................................... B60P 3/05
[52] U.S. Cl. ............................................. 296/24.1; 296/64
[58] Field of Search .............................. 296/24.1, 64, 21, 296/63

[56] References Cited

U.S. PATENT DOCUMENTS

| | | | |
|---|---|---|---|
| 2,563,917 | 8/1951 | Caesar et al. | 296/64 |
| 2,620,042 | 12/1952 | Vincent | 296/64 |
| 3,054,469 | 9/1962 | Moller | 296/64 |
| 3,736,020 | 5/1973 | Pilachowski et al. | 296/63 |
| 3,752,531 | 8/1973 | Jones | 296/64 |
| 3,807,788 | 4/1974 | Radek | 296/21 |
| 3,885,827 | 5/1975 | Sanders | 296/64 |
| 4,181,347 | 1/1980 | Clark | 296/64 |
| 4,223,938 | 9/1980 | Born | 296/21 |
| 4,712,822 | 12/1987 | Janos et al. | 296/24.1 |
| 4,964,671 | 10/1990 | Miller | 296/64 |
| 5,197,774 | 3/1993 | Diaz | 296/64 |
| 5,967,583 | 10/1999 | Wishart | 296/24.1 |

FOREIGN PATENT DOCUMENTS 413025   3/1946   Italy ........................................ 296/64

*Primary Examiner*—Joseph D. Pape
*Assistant Examiner*—Kiran Patel
*Attorney, Agent, or Firm*—James B. Middleton; Walter A. Rodgers

[57] ABSTRACT

The invention relates to an arrangement in a vehicle intended and equipped for various display purposes. The arrangement comprises means for tilting the vehicle floor in at least part of the vehicle. This way the vehicle can be rapidly and flexibly formed into an auditorium with a tilted floor, and a conference or showroom with a level floor.

7 Claims, 2 Drawing Sheets

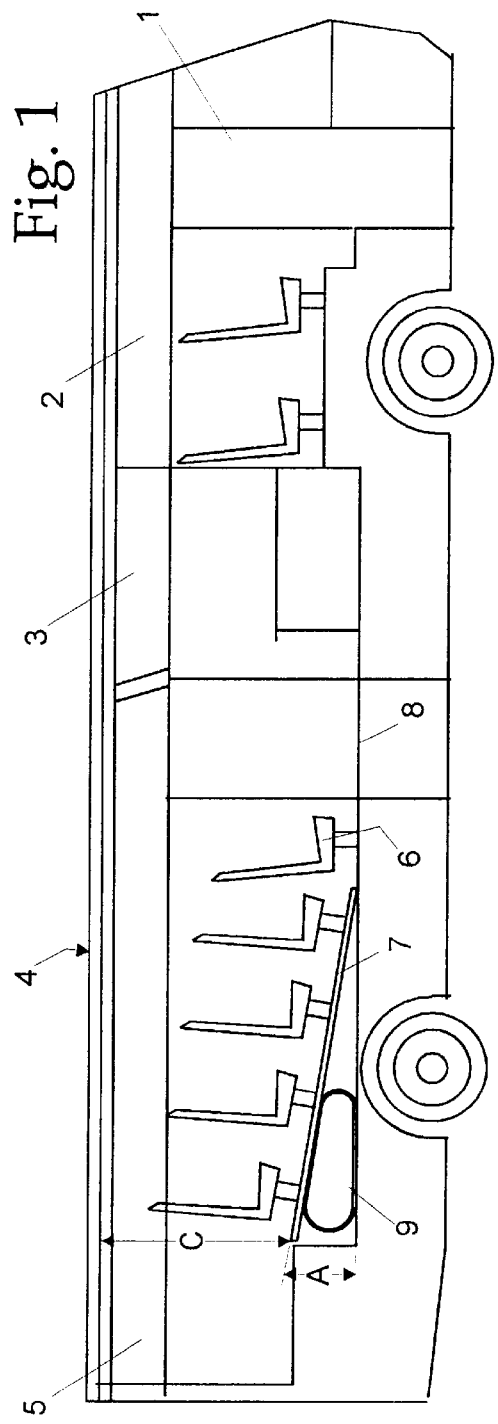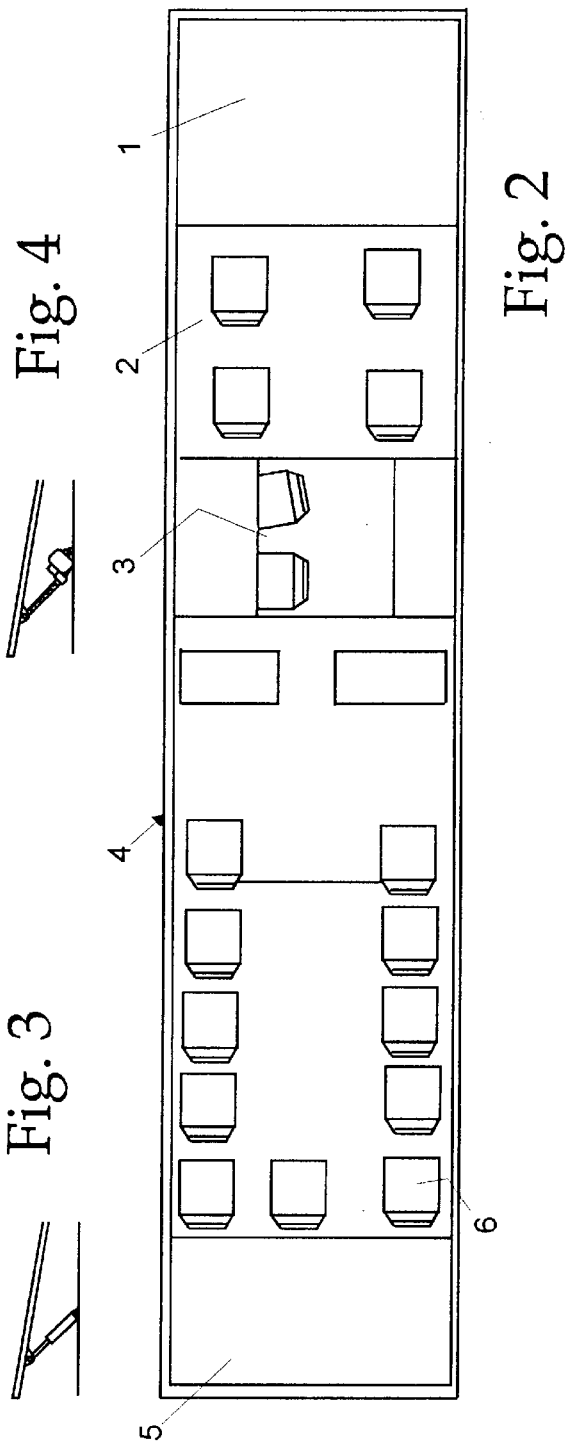

ARRANGEMENT IN VEHICLE

BACKGROUND OF THE INVENTION

1. Field of the Invention

This invention relates generally to show rooms and the like, and is more particularly concerned with a vehicle adapted and equipped for various displays and entertainment purposes, the vehicle comprising a showroom provided with seats in at least two successive rows.

2. Discussion of the Prior Art

The prior art includes various wheeled exhibition equipment, vehicle mounted showrooms, entertainment and conference rooms and other "road show equipment", which can be conveyed or transported on their own platform to the customer. Such showrooms are usually built on a bus chassis, but constructions built on trailers are also in use. The purpose of such equipped showrooms is to transport a company or a piece of equipment to be displayed to a customer, providing better service to the customers. When the premises are transported to the customer's yard, the customer does not have to spend time and money traveling. The solution is also advantageous from the point of view of the product demonstrator since it allows efficient display tour planning involving visits to a plurality of destinations, thus saving time and money. The scope of mobile premises is, naturally, broader than that of corresponding fixed premises. Furthermore, vehicles of the type described can be used, e.g. as efficient training premises, which can be transported to the company or the desired location. This also allows training and conferencing during traveling.

The problem in current vehicles intended for display purposes is that it is difficult to arrange reasonable visibility and audibility for all participants in small premises. A presentation taking place at the front of the showroom is difficult to follow from the rear parts of the vehicle. Attempts have been made to solve the problem by building, on a bus chassis, a showroom with an inclined floor at the rear end, and providing the showroom with tiered seats. The problem with this solution is, however, that the vehicle is restricted to be used solely as a mobile auditorium. It is not suitable, e.g., for conferences, buffet meetings or other occasions at which people need to move around the premises. On the whole, walking on an inclined floor is inconvenient. Further, it is difficult to display products or the like in premises having an inclined floor. Consequently, such an auditorium is structurally very inflexible and suitable for one purpose only. In this case the vehicle, often very expensive, is inefficiently utilized since it cannot be used in a variety of ways.

SUMMARY OF THE INVENTION

It is an object of the present invention to provide a more versatile vehicle than the prior art, and to improve the preparedness of the vehicle for various display uses.

In the present invention, at least part of the showroom floor is connected pivotally, and the arrangement comprises means for tilting the pivoted floor to the desired angle with respect to the fixed floor, and for moving said pivoted floor in substantially the same direction as the fixed showroom floor. At least part of the floor surface of the vehicle can be tilted at the desired angle by transfer means and moved to the same level, or at least in the same direction, as the fixed floor surface of the vehicle. This way the showroom can be turned into an auditorium with seats tiered at different heights. Furthermore, the same premises can be converted into a space with a substantially level floor, whereby it can be used e.g. in conferences, when people need to move around in the showroom, or if products are to be displayed.

It is an advantage of the invention that the vehicle can be utilized in more versatile ways than previously to various display, entertainment and training sessions and conferences. The inclination of the floor rapidly and flexibly ensures a good auditory and visual communication, resembling that of an auditorium. Furthermore, with the floor only slightly inclined or substantially horizontal, the vehicle can be used in a variety of ways when it is not desired to create auditory and visual communication to the front of the showroom. The invention also allows the floor to be tilted as required by the display, making the display more effective. A further advantage is that the floor can be tilted, if required, after the spectators have been seated. This facilitates the movement of, in particular, handicapped people in the vehicle. A still further advantage of the invention compared with the prior art fixedly tilted vehicle floor is that, during transport, the showroom can be kept in a horizontal position, which is more convenient from the point of view of the passengers. In this case the seat is more pleasant to travel in, and offers a place to rest with the front seats providing visual and auditory protection. Furthermore, travelling is safer with the floor in the basic position, since in a collision the front seat prevents the person from being thrown forward, simultaneously giving protection against objects flying from the front. A still further advantage is that various maintenance and repair operations are easier to carry out with the floor moved to the horizontal plane.

BRIEF DESCRIPTION OF THE DRAWINGS

These and other features and advantages of the present invention will become apparent from consideration of the following specification when taken in conjunction with the accompanying drawings in which:

FIG. 1 is a schematic side view of a vehicle equipped in accordance with the present invention, and showing the floor tilted;

FIG. 2 is a schematic top view of the vehicle shown in FIG. 1;

FIGS. 3 and 4 are fragmentary views showing modified floor tilting means;

DETAILED DESCRIPTION OF THE EMBODIMENT

Figure 5:
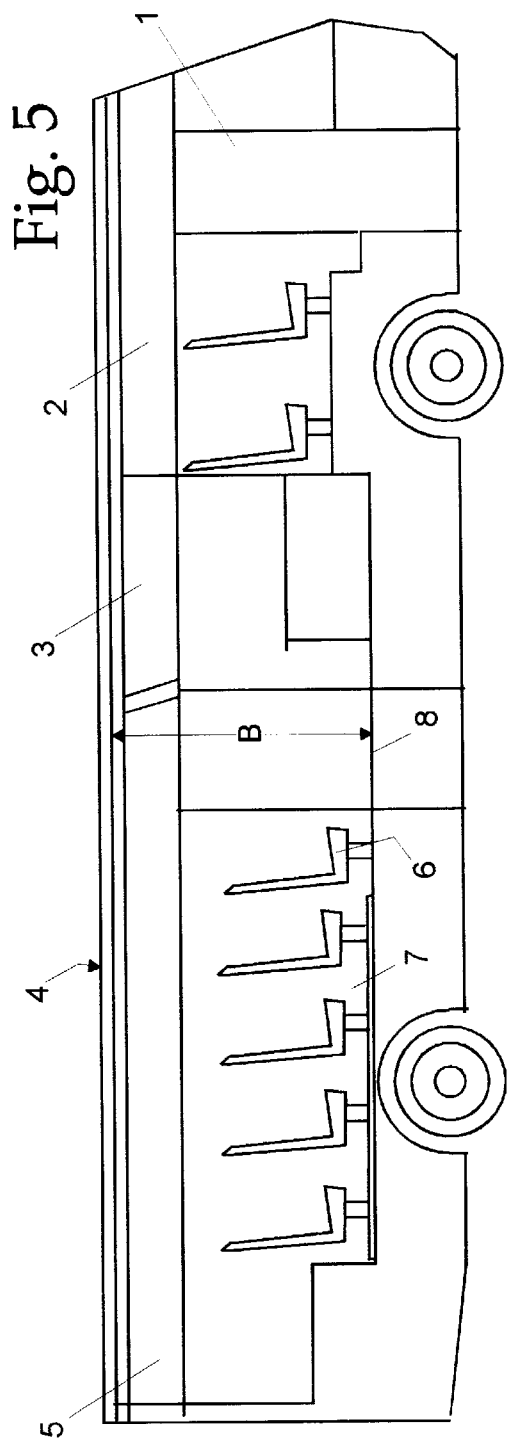
FIG. 5 is a view similar to FIG. 1, but showing the floor horizontal.

FIG. 1 schematically shows a multi-use vehicle constructed in the frame of a bus. A bus is a natural chassis to be used in the arrangement of the invention, but the invention can be applied to other ground equipment, such a trailers, trucks and vans. The vehicle shown in the figure comprises, starting from its front end, a cab 1, a cabinet 2, a kitchen 3, an actual showroom 4, and service spaces 5 at the rear of the vehicle, including e.g. a toilet and a trunk. The cab 1 is preferably isolated from the rest of the space, allowing the driver to concentrate on his tasks. The cabinet 2 is similarly separable by curtains, movable partitions or the like from the rest of the space, allowing it to be used as a separate private passenger cabin or, e.g. the conference room of a small group. The vehicle of FIG. 1 further comprises a kitchen, enabling catering during exhibition. If required the kitchen 3 can also be used as a product display and showroom. As is evident, the showroom 4 operates both as the premises for various displays and as a normal passenger cabin. A required number of seats 6 are arranged in the showroom, the number naturally being dependent on the available space. In the solution of the example, the number is 11, arranged in five rows transversely to the vehicle, as is seen in FIG. 2. In versions built on a bus chassis or other relatively narrow frame, a passage has to be arranged between the parallel seats. On the other hand, the passage can be utilized when the seats are turned to a conference position in the manner shown in FIG. 6.

The vehicle is further provided with an arrangement comprising means for tilting and locking at least part of the showroom flooring at the desired angle. In this case the part 7 of the floor that can be tilted is pivotally connected with respect to the fixed floor 8 of the showroom. Tilting is achieved by using at least one transfer means 9, which can be, e.g. a pneumatic bellows, disposed in the space between the floor 7 to be tilted and the frame of the vehicle, at the free end of the part of the floor to be tilted. In this case the angle of tilt A depends on the amount of air in the bellows. It is natural to use pressurized air with heavy equipment, since pressurized air is produced in heady equipment for other purposes, too, e.g. for brakes and door actuators. The tilting may naturally also be achieved by means of a pressure medium driven cylinder, e.g. a hydraulic cylinder as shown in FIG. 3, or alternatively by arranging an electric motor to use a screw/nut combination as shown in FIG. 4, or an equivalent mechanical structure providing the transfer movement. The angle of tilt A is preferably between 0 and 30° and is steplessly adjustable. The arrangement may alternatively comprise limits that can be defined and enable tilting of the floor to preset angular positions. In a lower position the floor 7 to be tilted can settle either at the same level as the adjacent fixed floor 8, or there may be a slight difference in height therebetween. The height B of the interior of the vehicle is, in turn, preferably arranged such that, even when the floor is in a tilted position it is possible to move around in the showroom 4 without any danger of hitting one's head on the ceiling. Setting the height B of the interior at e.g. 2,400 mm (7½ feet) allows a sufficient angle of tilt A from the point of view of visibility, and a sufficient interior height even at the highest point C of the tilted part. Furthermore, the seats 6 can be tilted so that the position of the seat can be maintained substantially unchanged irrespective of the tilting of the floor. This may also be arranged to take place automatically according to the angle of tilt of the floor.

FIG. 2 shows the layout of the vehicle of FIG. 1. The figure shows the seats 6 in a normal position, i.e. facing straight ahead in the direction of travel of the vehicle. The seats are preferably in this position during travel, and when a display is taking place in the showroom.

FIG. 5 shows the vehicle of FIG. 1 with the movable floor 7 in a lowered position. For the sake of clarity the floor transfer means are not presented. The seats 6 are preferably arranged by means of suitable quick-disconnect fittings, and can be disconnected to form different arrangements as needed. This also allows one larger area to be formed for e.g. exhibitions.

Figure 6:
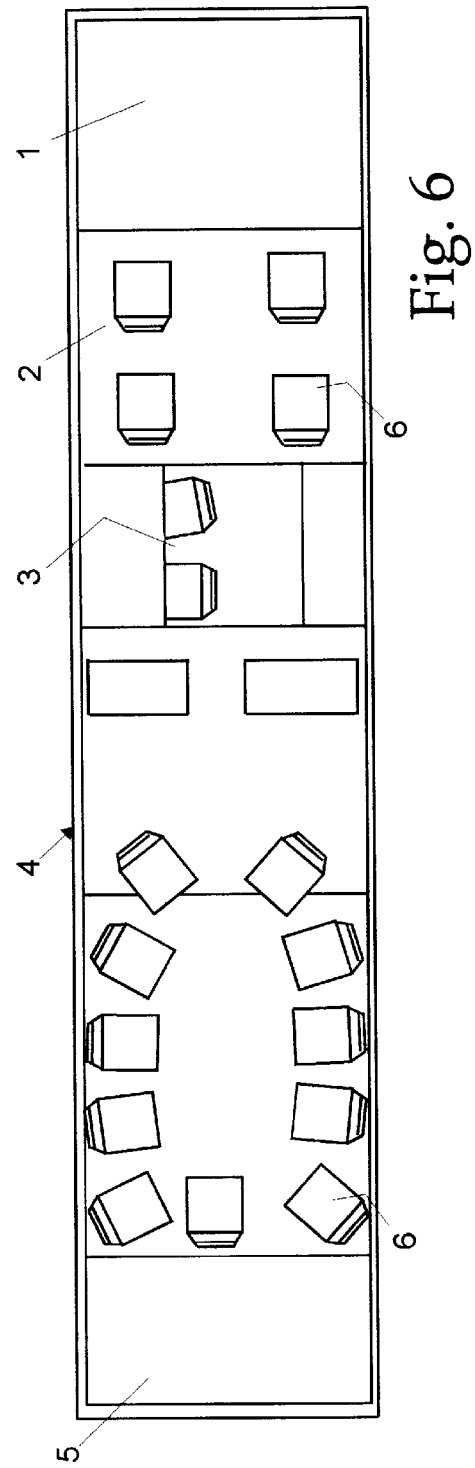
FIG. 6 is a view similar to FIG. 2, but showing the seats grouped as for a conference.

FIG. 6 further shows an alternative layout for the vehicle according to the previous figures. In this case the seats 6 have been moved to a conference position both in the actual showroom 4 and in the cabinet 2. For this purpose the seats 6 are preferably arranged to be guided by rails or the like, allowing them to be moved and turned along these control elements and locked in the desired position.

The drawings and the related specification are intended only to illustrate the inventive idea. The details of the invention may vary within the scope of the claims. In other words, it is not at all necessary to divide the vehicle into different compartments in the manner presented in the drawings, but the vehicle can be composed of a completely undivided space, providing one continuous showroom, or it can be composed of compartments divided by customers in a manner different from that presented in the drawings. Furthermore, the tilting floor can be arranged in some other location than at the rear of the showroom as shown in the drawings. Accordingly, the entire showroom floor can be tilted, providing a spacious auditorium. The tilting can be carried out either in the longitudinal or in the lateral direction of the vehicle. To tilt the vehicle floor in the longitudinal direction is a particularly successful solution in e.g. a display bus comprising a separate projection which can be moved in the projection and the rest of the bus floor can be tilted to constitute the auditorium. This also avoids unnecessary passages. The rear and front of the showroom can also be separately tilted so that a horizontal space for the display is left therebetween. Another alternative is to tilt the movable part of the floor, not only upwards, but even below the fixed floor, making it easier to follow e.g. video or slide shows from the lower level, since usually the display devices are installed close to the ceiling of the vehicle. Furthermore, the floor to be tilted does not have to be pivoted at one edge, but the pivoting can be arranged at a distance from the edge, and when the floor is tilted, the portion of the floor on the first side of the pivoting moves up and, correspondingly, the portion on the other side moves down as a seesaw. The entire floor to be tilted can also be arranged movable in the vertical direction. In designing the structures of the vehicle, one must make sure that no risk of squeezing is created at any point between the floor to be tilted and the other structures of the vehicle. Although the drawings and the related specification deal with an embodiment of the invention constructed on a bus chassis by way of example, the arrangement of the invention can very well be applied to rail equipment. It is also well suitable for boats, ships, aircraft and the like.

What is claimed as invention is:

1. A vehicle arrangement comprising a showroom having a floor, a portion of said floor being fixed, said showroom being provided with seats in at least two successive rows, the improvement wherein at least part of said floor is connected pivotally to said fixed floor to provide a tiltable portion, said seats being disposed on said tiltable portion, and including means for tilting said tiltable portion to a desired angle with respect to said fixed floor, said tiltable portion of said floor being disposed substantially in the same direction as said fixed floor.

2. A vehicle arrangement as claimed in claim 1, wherein said tiltable portion is movable substantially to the same plane as said fixed floor.

3. A vehicle arrangement as claimed in claim 1, wherein an angle of tilt of the tiltable portion of the showroom floor is between 0 and 30 degrees with respect to a horizontal plane of the vehicle.

4. A vehicle arrangement as claimed in claim 1, wherein the entire tiltable portion is arranged to be movable in the vertical direction.

5. A vehicle arrangement as claimed in claim 1, wherein said means for tilting comprises a pneumatic bellows.

6. A vehicle arrangement as claimed in claim 1, wherein said means for tilting comprises a pressure medium driven cylinder.

7. An arrangement as claimed in claim 1, wherein said means for tilting comprises a motor and a screw mechanism coupled thereto.

\* \* \* \* \*